(12) United States Patent
Browne (10) Patent No.: US 7,176,944 B2
(45) Date of Patent: Feb. 13, 2007

(54) OPACITY BASED INTERFERENCE TEXTURE

(75) Inventor: Cameron Bolitho Browne, Burleigh Heads (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/277,171

(22) Filed: Mar. 26, 1999

(65) Prior Publication Data

US 2002/0149597 A1 Oct. 17, 2002

(30) Foreign Application Priority Data

Mar. 27, 1998 (AU) .................................... PP2650

(51) Int. Cl.
 *G09G 5/02* (2006.01)
(52) U.S. Cl. ..................... 345/629; 345/635; 345/641; 345/690
(58) Field of Classification Search ................ 345/429, 345/430, 431, 432, 433, 422, 505, 419, 420, 345/592, 629, 635, 641, 640, 611, 604, 606, 345/790, 690; 382/154
See application file for complete search history.

(56) References Cited

U.S. PATENT DOCUMENTS

| | | | | |
|---|---|---|---|---|
| 5,363,475 A | * | 11/1994 | Baker et al. ................. | 345/422 |
| 5,396,594 A | * | 3/1995 | Griffith et al. ............... | 345/549 |
| 5,577,177 A | * | 11/1996 | Collins et al. ............... | 345/469 |
| 5,594,854 A | * | 1/1997 | Baldwin et al. ............. | 345/441 |
| 5,861,891 A | * | 1/1999 | Becker ........................ | 345/619 |
| 5,870,097 A | * | 2/1999 | Snyder et al. ............... | 345/426 |
| 5,936,633 A | * | 8/1999 | Aono et al. .................. | 345/589 |
| 6,034,697 A | * | 3/2000 | Becker ........................ | 345/433 |
| 6,147,690 A | * | 11/2000 | Cosman ...................... | 345/592 |
| 6,160,907 A | * | 12/2000 | Robotham et al. .......... | 382/154 |
| 6,504,545 B1 | * | 1/2003 | Browne et al. ............. | 345/473 |
| 2002/0130871 A1 | * | 9/2002 | Hill et al. .................... | 345/467 |

FOREIGN PATENT DOCUMENTS

AU 30609/95 3/1996

(Continued)

OTHER PUBLICATIONS

Generating Textures on Arbitrary Surfaces Using Reaction-Diffusion , Greg Turk , University of North Carolina at Chapel Hill,Computer Graphics, vol. 25, No. 4, Jul. 1991.*
Deformable Curve and Surface Finite-Elements for, Free-Form Shape Design, George Celnikera and Dave Gossardb;Computer Graphics, vol. 25, No. 4, Jul. 1991.*

(Continued)

*Primary Examiner*—Kee M. Tung
*Assistant Examiner*—J. Amini
(74) *Attorney, Agent, or Firm*—Fitzpatrick, Cella, Harper & Scinto (57) ABSTRACT

A method and apparatus for generating a colored or shaded texture for images to be displayed on a display device or printed. The method includes the step of providing a plurality of shape elements, each of which defines a surface. Each of the shape elements also has an associated opacity which varies across its surface. The shape elements are arranged in an overlapping fashion and then rendered for output to a printer or display device. The overlapping opacities and opacity gradients provide a visually interesting colored or shaded texture. Preferably the shape elements are circles and the opacity is applied as a cone-shaped function tapering to zero opacity at its edges.

36 Claims, 8 Drawing Sheets

FOREIGN PATENT DOCUMENTS

| | | |
|---|---|---|
| AU | 695019 | 3/1996 |
| EP | 000902378 A2 * | 3/1999 |

OTHER PUBLICATIONS

Illustrating Surface Shape in Volume Data, via Principal Direction-Driven 3D Line Integral Convolution Victoria Interrante, Institute for Computer Applications in Science and Engineering (ICASE).*

Bubble Mesh: Automated Triangular Meshing of Non-Manifold Geometry by Sphere Packing Kenji Shimadat and David C. Gossard; tIBM Research, Tokyo Research Laboratory;1995 AC 0-89791-672-7/95/0005.*

Multiresolution Sampling Procedure for Analysis and Synthesis of Texture Images Jeremy S. De Bonet_Learning & Vision Group Artificial Intelligence Laboratory Massachusetts Institute of Technology.*

Opacity-modulating Triangular Textures for Irregular Surfaces, Penny Rheingans, Department of Computer Science, O-7803-3707-7196 . 1996 IEEE.*

Interactive Texture Mapping Jerome_, Hussein Yahiaz, Anne Verroustz_Thomson Digital Image, 1993 ACM-0-89791-601-8/93/008.*

Piecewise Surface Flattening for Non-Distorted Texture, Mapping Chakib Bennis ' Jean-Marc Vezien Gerard Iglesias.Computer GraDhics, vol. 25, No. 4. Jul. 1991.*

Adaptive Precision in Texture Mapping, Andrew Glassner, Department of Computer Science,vol. 20, No. 4, 1986.*

Cellular Texture Generation, Kurt W. Fleischer, David H. Laidlaw, Bena L. Currin, Alan H. Barr, California Institute of Technology, 1995 ACM-0-89791-701-4/95/008.*

* cited by examiner

OPACITY BASED INTERFERENCE TEXTURE

FIELD OF INVENTION

The present invention relates to a method of generating a coloured or shaded texture to be displayed on a display device or printer.

The invention has been developed primarily for use in generating background effects for displayed or printed matter. However, it will be appreciated that the textures generated may be applied to any suitable subject, including sprites, lettering, and the surfaces of three-dimensional representations.

BACKGROUND

A number of prior art systems have been developed to generate various types of textures. Typically, these systems involve modulation of existing functions, such as Perlin noise functions, reaction-diffusion or vector fields. Alternatively, an existing image may be modulated using these or similar functions. However, such approaches tend to be relatively processor intensive, which may be a disadvantage where speed is important.

There is an ongoing interest in generating visually interesting textures in a relatively simple, fast manner, for use with all types of text and graphics manipulation and display. In particular, there is an ongoing need for visually interesting parameterised textures which can be applied to font characters and relatively easily customised for particular applications without the need for large amounts of manual input from a user.

SUMMARY OF INVENTION

The present invention provides a method of generating a coloured or shaded texture for images to be displayed on a display device or printed, the method including the steps of:

(a) providing a plurality of shape elements, each shape element defining a surface;

(b) providing each of the shape elements with an opacity which varies over its surface;

(c) arranging the shape elements in an overlapping fashion; and (d) rendering the shape elements for output to a printer, storage or a display device, such that the overlapping opacities generate a coloured or shaded texture.

Preferably the shape elements are regular geometric shapes, and are all of the same general shape. It is also preferred that the shape elements be of a similar size. In a particularly preferred embodiment, the shape elements are circles.

Preferably, the shape elements are positioned at predetermined points within a closed curve, such as an outline of a font character.

Other aspects of the invention are described in the following detailed description.

BRIEF DESCRIPTION OF DRAWINGS

Preferred embodiments of the invention will now be described, by way of example only, with reference to the accompanying drawings, in which.

DETAILED DESCRIPTION OF PREFERRED EMBODIMENTS

Referring to the drawings, the preferred embodiment of the invention provides a method of generating a coloured or shaded texture for images to be displayed on a display device or printer. The basic steps in performing the preferred embodiment are set out in the flowchart 1400 of FIG. 14. Initially, in step 1401, a plurality of shape elements are provided. Each shape element defines a surface, and in the preferred form, is a regular polygon or circle. Each of the shaped elements is provided with an opacity in step 1402, and the shape elements are then arranged in an overlapping fashion in step 1403. Usually, the area within which the shape elements are arranged will be bounded by a closed curve, such as the edges of a font character. Alternatively, if the preferred embodiment is being used as a means of generating a background texture, no boundary other than the edges of the image itself will apply.

The overlapping shape elements are then rendered in step 1404 for output to a printer 1405, display 1407 or memory 1406. It will be appreciated that each of components 1405, 1406 and 1407 are implemented on a computer system, such as that discussed below in relation to FIG. 13.

In the preferred, coloured embodiments, a coloured texture is generated by means of interference in colour space when overlapping shapes of varying opacity are composited. In this way, the resultant texture is effectively encoded in the colour (or shade) and opacity of the shapes, and is not realised until rendering.

The method requires that a plurality of overlapping shapes be provided, thereby to ensure the requisite interference. Typically, the shape elements are regular geometric shapes, and will usually be of uniform size and shape. However, different sizes and shapes may be mixed to provide varying visually interesting textures.

As shown in the various figures, it is particularly desirable that the shape elements be circles, although other shape elements such as squares, hexagons or other regular polygons (not shown) may be used to provide different textures.

Figure 5:
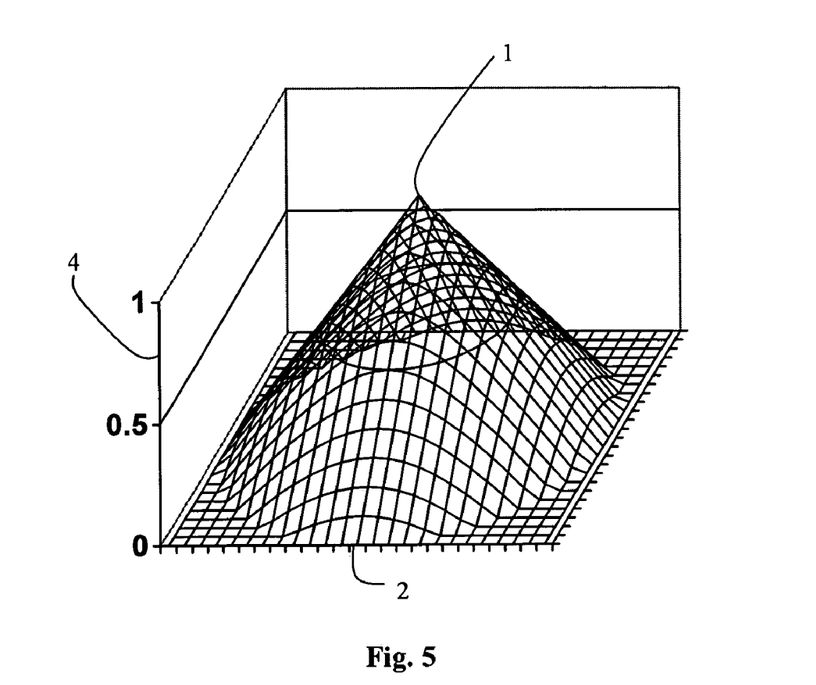
FIG. 5 shows a surface plot of opacity values across a unit square region in which the focus is 0.
Figure 6:
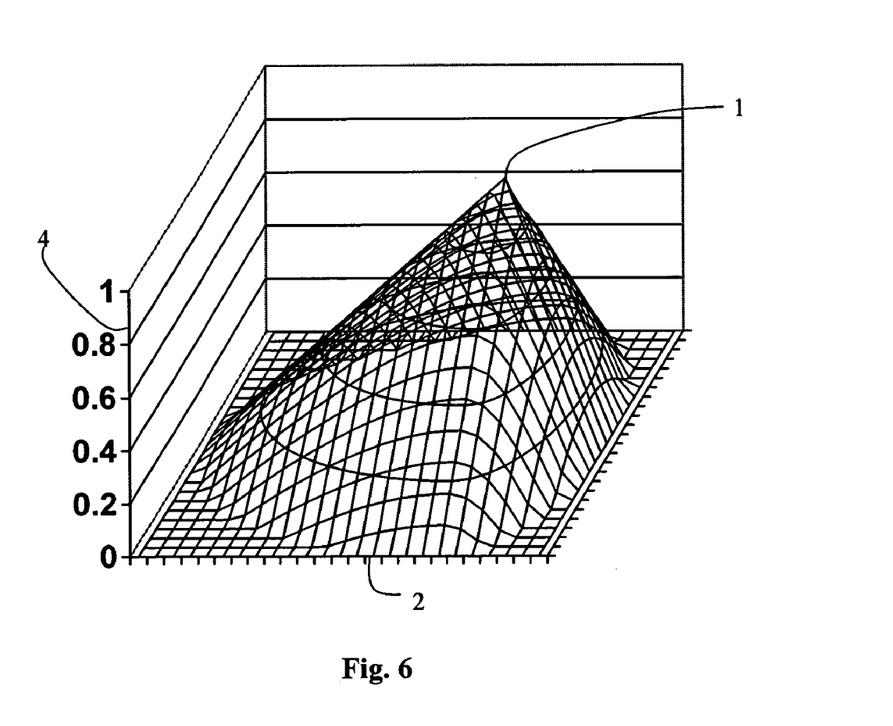
FIG. 6 shows a surface plot similar to that shown in FIG. 5, in which the focus is 0.5.
Figure 7:
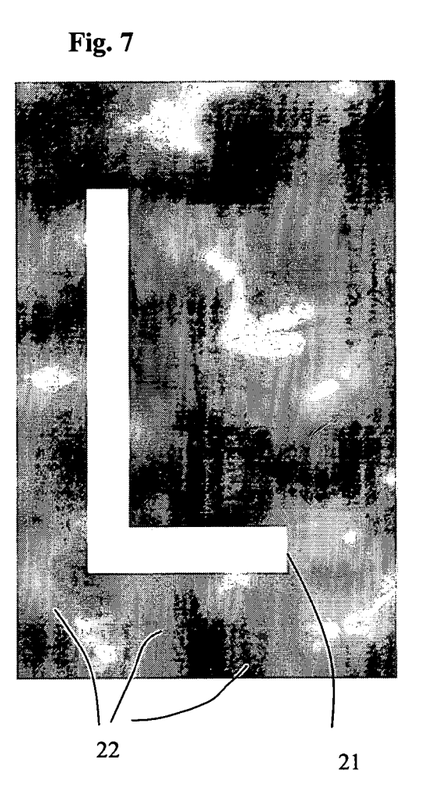
FIG. 7 shows a shaded texture overlayed with a flat shaded letter "L" (designated 21), generated in accordance with the preferred embodiment of the invention.
Figure 8:
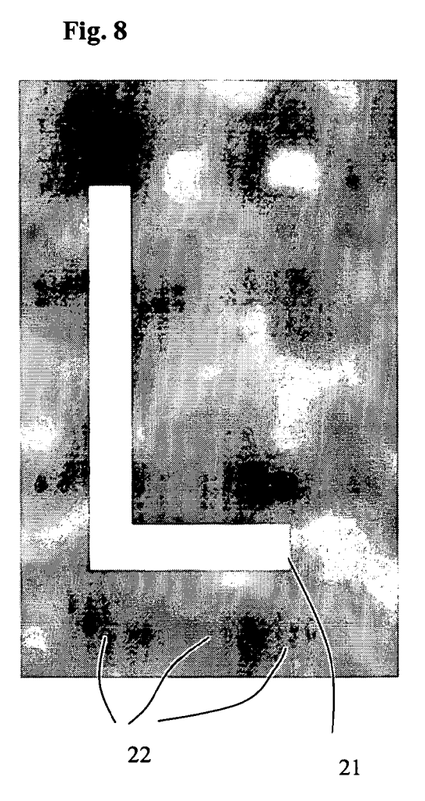
FIG. 8 is a shaded texture similar to that shown in FIG. 7, with the overlapping circles rendered using an OVER operator.
Figure 9:
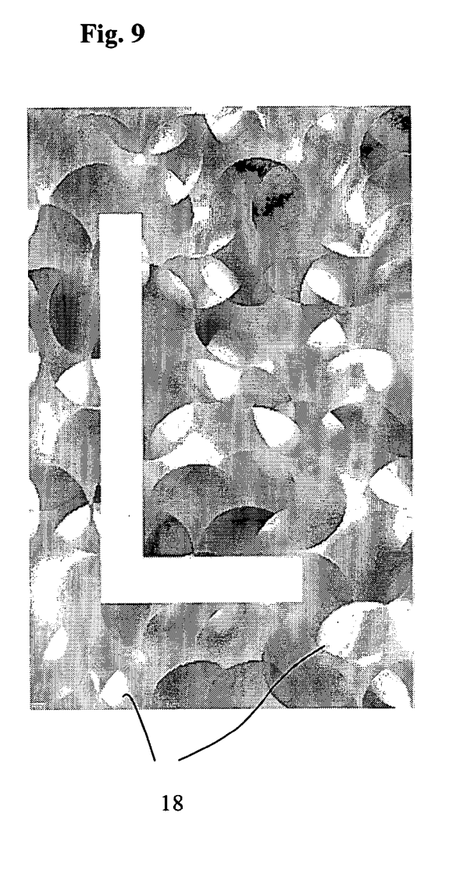
FIG. 9 is a shaded texture similar to that shown in FIG. 8, with a focus of 0.95.

Each shape has associated with it a focal point 1 defined relative to its perimeter. As shown in FIGS. 5 and 6, maximum opacity usually occurs at the focal point 1, and decreases towards a perimeter 2 of the circle. Opacity is shown on a vertical scale 4. As shown in FIG. 6, moving the focal point 1 towards the perimeter 2 skews the opacity with relation to the unit square, which, when composited with other shape elements, causes different visually interesting textures to be generated.

The opacity of each shape can vary between its focal point 1 and perimeter 2 according to any suitable function, although linear interpolation is used in the preferred embodiments. The use of linear interpolation helps to ensure a relatively consistent opacity value across the final texture.

Figure 1:
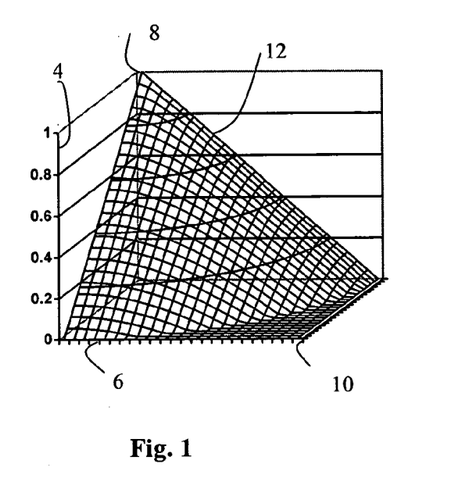
FIG. 1 is a surface plot showing opacity values across a unit square region, determined from a circle centred at one corner with opacity varying from 1 at its centre to 0 at its perimeter.
Figure 2:
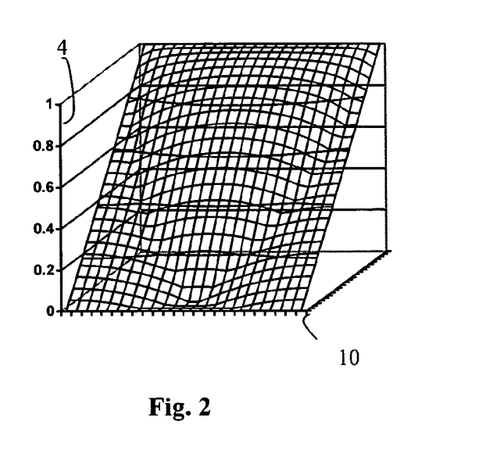
FIG. 2 is a surface plot similar to that in FIG. 1, determined from two circles centred at adjacent corners.
Figure 3:
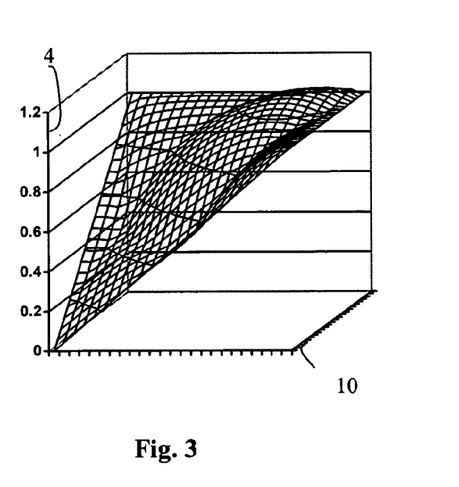
FIG. 3 is a surface plot similar to that shown in FIGS. 1 and 2, determined from three circles centred at three corners.
Figure 4:
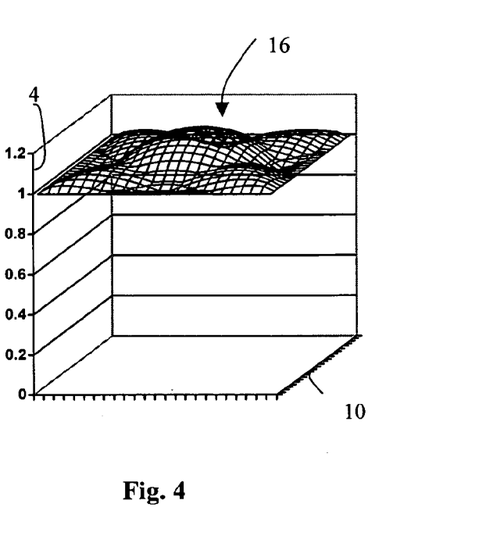
FIG. 4 is a surface plot similar to that shown in FIGS. 1, 2, and 3, determined from four circles centred at the corners.

Consistency of the opacity is also improved when the shapes are relatively evenly distributed across the texture region, and is of particular importance if the texture is to be used for further compositing operations. FIGS. 1 to 4 show the effects of overlaying opacities of neighbouring circles, each having a focus of 0. In FIG. 1, a circle 6 (only one quarter of which is shown) disposed in the horizontal plane and centred at a first corner 8 of a unit square 10 exhibits a relatively steep opacity gradient 12. FIG. 2 adds a circle to an adjacent corner, 14, thereby reducing the overall opacity differential across the unit square as a whole. FIG. 3 adds yet another circle, whilst FIG. 4 adds a final circle to the last free corner of the unit square 10. As shown in FIG. 4, the effect of multiple overlapping circles having relatively constant spacing and linear opacity gradients tends to produce a relatively constant opacity across the area in which the circles are disposed. There are, in this case, some minor "bumps" associated with the adding of the overlapping circles. However, these do not depart greatly from an opacity of 1. For example, a central bump 16 with an opacity of about 1.2 is the furthest deviation from an opacity of 1.0 across the whole unit square. An algorithm such as mesh fitting, well known to those skilled in the art, may be used to generate reasonably equidistant points at which to place the shape elements.

A focus parameter dictates the relationship of the focal point 1 to its associated perimeter 2. In a preferred embodiment, a default value of 0 indicates that the focal point 1 is at the circle's centre, as shown in FIG. 5, whilst a value of 1 indicates that the focal point 1 is on the perimeter of the circle. FIG. 6 shows the case where the focal point 1 is shifted 0.25 units towards the perimeter 2.

Figure 10:
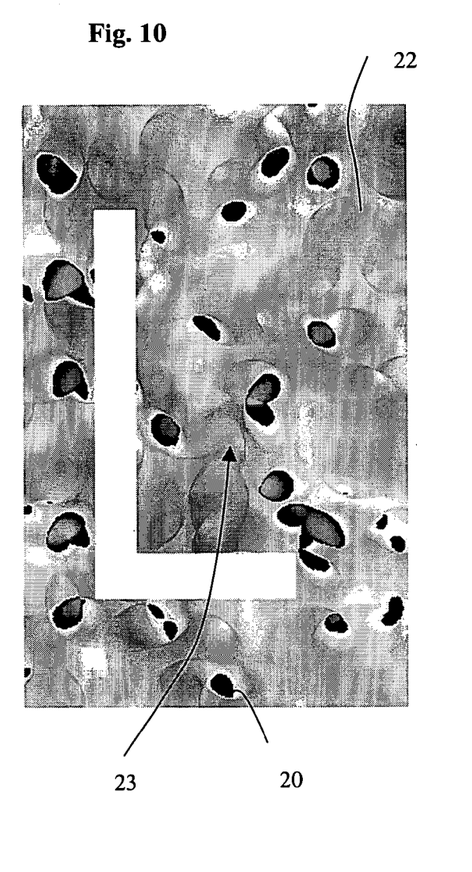
FIG. 10 is a shaded texture similar to that shown in FIGS. 8 and 9, with a focus of 1.5, and with the opacities rendered using a PLUSW operator.

In the preferred form, the available focus parameter values vary between the centre of the circle and the perimeter 2, although in other embodiments the focus parameters can extend beyond this range to allow focal points outside the perimeter 2. Varying the focus parameter results in colour and opacity discontinuities which can give an impression of substantial shape not offered by other texture-generation algorithms. For example, in FIG. 9 there are shown discontinuities 18 in brightness as the colours and opacities "wrap" around. This occurs as composited opacities which exceed a predetermined maximum opacity respectively are remapped to a lower opacity. An analogous colour "wrapping" takes place as colours are composited in combination with varying opacities. For focal points 1 which exceed a focus parameter of 1.0, this "wrapping" can become more noticeable, as shown in FIG. 10. The sharp blackwhite discontinuities 20 are examples of this. In FIGS. 7 to 10, there appear regions of gradually changing shade 22, which imply solidity or three-dimensionality.

The colour of each component shape is independent of the opacity function used, and may be a flat colour, a colour blend, or even a shade. Flat colour is preferred due to ease of implementation, although other visually interesting patterns may be achieved by varying the colours of the various shape elements. Various compositing operators may be used to calculate overlapping shape opacity, and include those typically used in computer graphics, such as: OVER (FIGS. 8 and 12), XOR, PLUSC (FIGS. 7, 9, 11), and PLUSW (FIG. 10). It will be appreciated that the PLUSC operator causes a colour component to clamp on overflow, whilst the PLUSW operator results in wrapping of the colour component on overflow. The PLUSW operator is of particular interest, because it introduces colour discontinuity resulting from colour wrapping without introducing opacity discontinuities. This is why the texture in FIG. 10 appears smoother, as shown in region 23, without the opacity discontinuities introduced by other operators.

Figure 11:
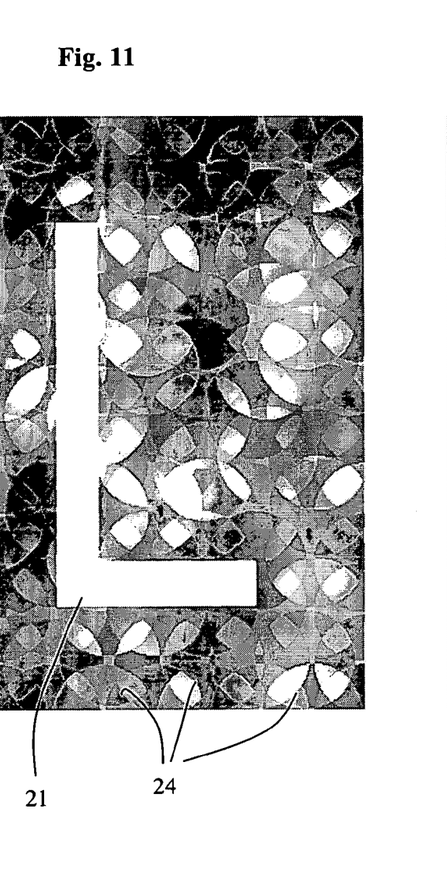
FIG. 11 is a shaded texture similar to that shown in FIGS. 8 to 10, in which opacity varies from 0.75 at the focal point to 0.25 at the perimeters of the shapes.
Figure 12:
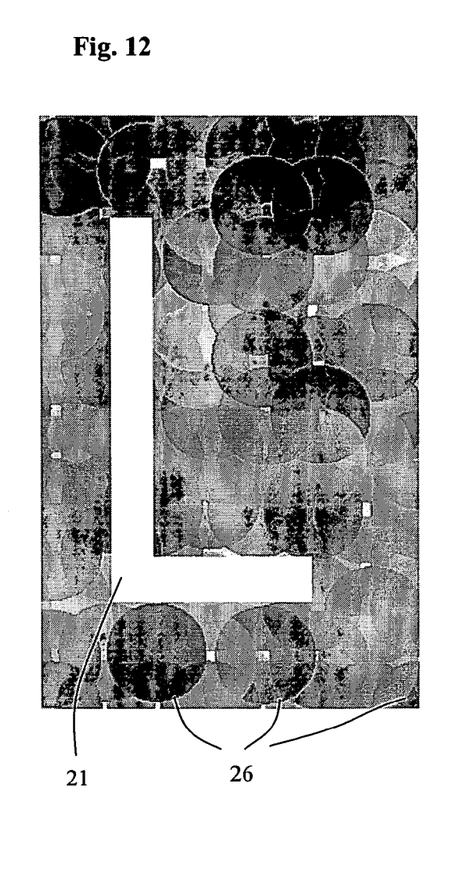
FIG. 12 is a shaded texture similar to that shown in FIGS. 8 to 11, in which opacity varies from 0.25 at the focal point to 0.75 at the perimeters of the shapes.

Referring to FIG. 11, there is shown a texture generated by the method of the invention, whereby the opacity at the focal point is 0.75, and the opacity of the perimeter is 0.25. This results in definite opacity discontinuities 24 at the edges of circles, because the opacity of each circle does not taper to 0 at the perimeter. FIG. 12 illustrates a similar arrangement, in which the opacity is 0.75 at the perimeter and 0.25 at the focal point, composited using an OVER operator. The relatively high opacity at the edge of each circle generates even more distinct opacity discontinuities 26 than are shown in FIG. 11. These examples demonstrate the quite different effects which can be generated by altering a relatively small number of parameters.

The colour space in which the overlapping shapes are rendered has a direct bearing on the resultant texture. CIE L*a*b*, a colour space based on the human eye's sensitivity to colour, is the preferred choice of colour space, as it results in colours combining in a non-intuitive way to produce visually interesting results. However, the method will work for other colour spaces commonly used in computer graphics, such as RGB or CMY, and can give visually different results for each.

Varying any of the many parameters of the shape elements will correspondingly vary the resultant texture. Accordingly, the size of the shape elements, the geometric shapes represented, the density of the shape elements, the opacities and opacity gradients as well as the colour space and compositing operators, can be selected and altered at will to generate interesting textures.

Figure 15:
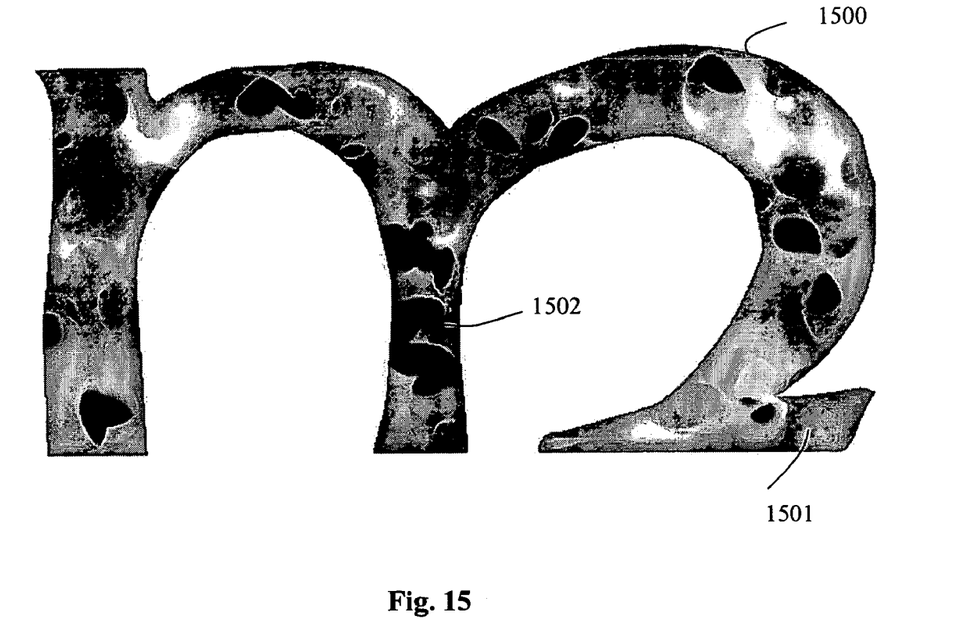
FIG. 15 is font character "m" to which there has been applied a shaded texture in accordance with the preferred embodiment.

In a particularly preferred embodiment, the shaded texture described is applied within a closed curve defined by a boundary. One particular application of this embodiment is shown in FIG. 15, in which an outline 1500 of a font character "m" has been filled with a texture 1501 generated in accordance with one of the preferred embodiments described above. The shape elements (circles 1502 in this embodiment) are positioned within the outline 1500, either randomly or by means of a known point distributing method such as wave-propagation from boundary points. It will be appreciated that the relatively low processor requirements for filling the outline of a font character means that font textures can be generated and manipulated by users "on the fly". Also, new texture parameters falling within the scope of the present invention can be defined and immediately applied to existing text characters, or to text characters immediately as they are typed or otherwise input by an operator.

In a further arrangement the colour component of the shape elements is varied as a function of time. The shape elements are rendered periodically to change the appearance of the displayed texture. The colour components may be varied in a cyclic fashion, wherein a period is assigned to each of the colour components. The period associated with the cyclic colour change may be randomly selected.

In another arrangement the opacity of one or more shape elements may be varied over time. The shape elements are periodically rendered to yield an animated texture. The opacities may be varied in a cyclic fashion, and the period associated with the cyclic opacity change may be selected at random for each shape element.

The preferred embodiments of the invention are typically implemented as a computer application program hosted on the Windows™ operating system developed by the Microsoft Corporation. However, those skilled in the art will recognise that the described embodiment can be implemented on computer systems hosted by other operating systems. For example, the respective embodiments can be performed on computer systems running Unix, OS/2, and DOS. The application program has a user interface that includes menu items and controls that respond to mouse and keyboard operations. The application program has the ability to transmit data to one or more printers either directly connected to the host computer or accessed over a network. The application program also has the ability to transmit and receive data to a connected digital communications network (for example, the internet).

Figure 13:
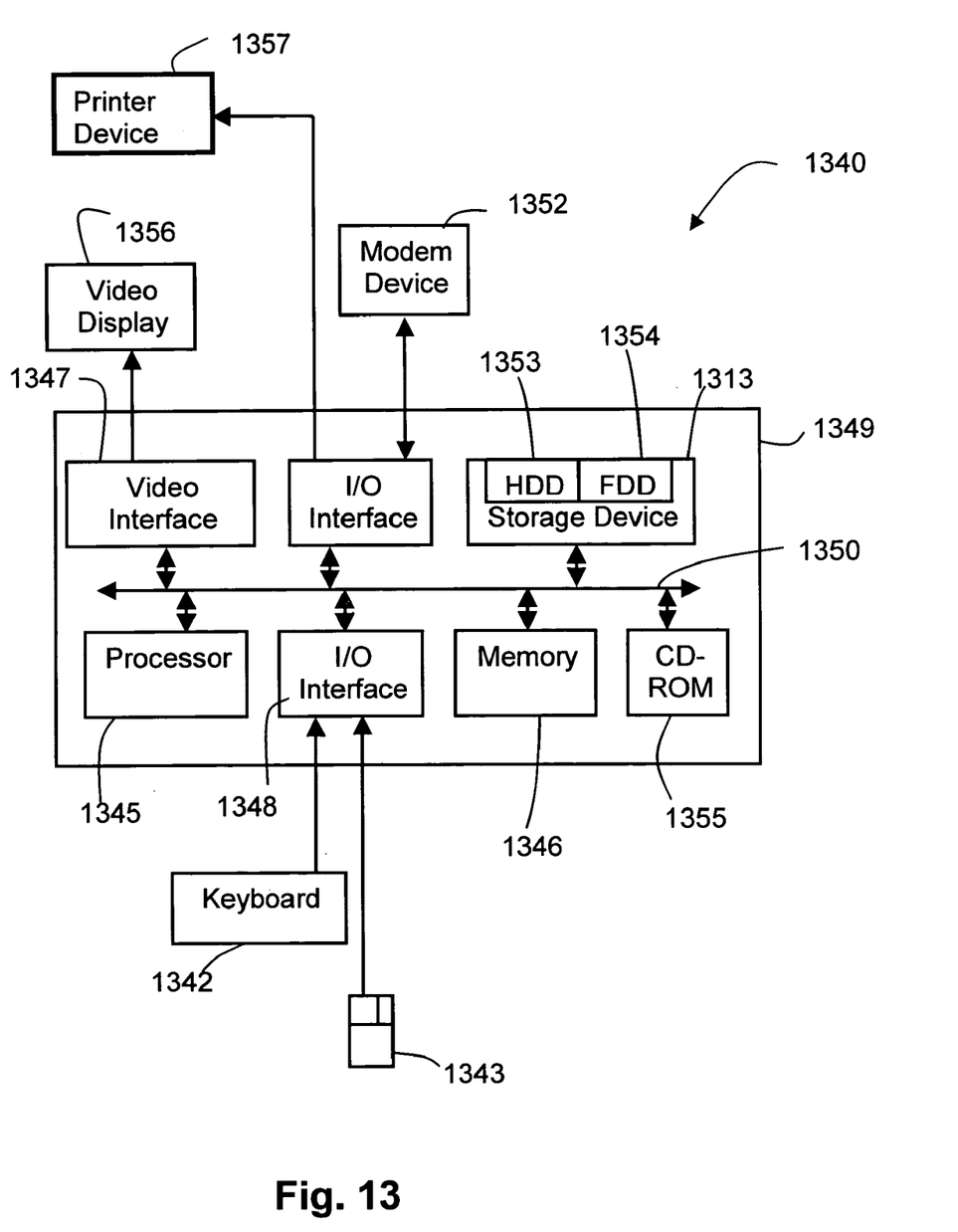
FIG. 13 is a schematic diagram of computer apparatus for use in implementing preferred embodiments of the invention.
Figure 14:
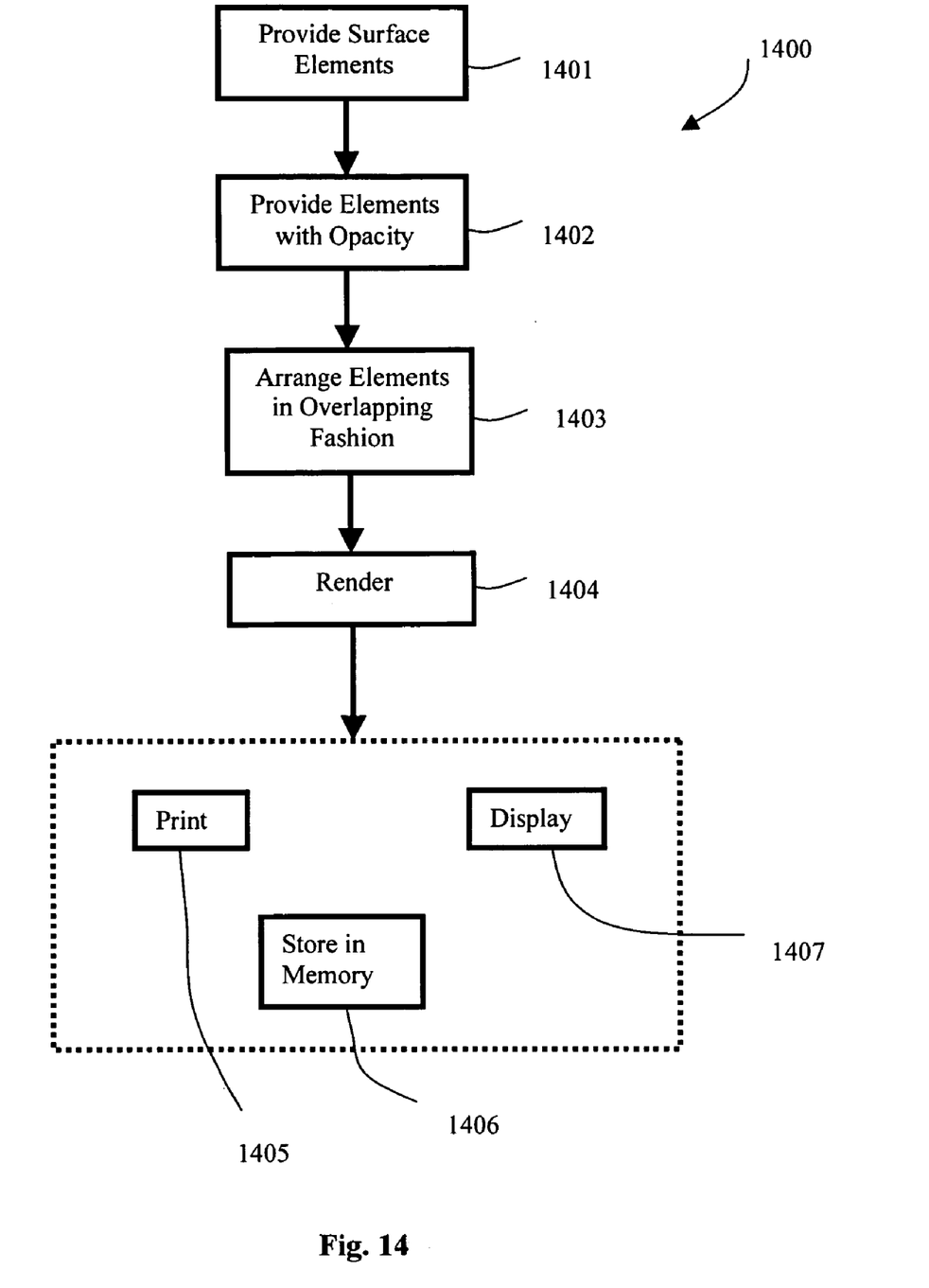
FIG. 14 is a flowchart showing the steps involved in implementing a preferred form of the invention.

The preferred embodiment of the invention can be practiced using a conventional general-purpose computer system, such as the computer system 1340 shown in FIG. 13. The application program is implemented as software executed on the computer system 1340.

The computer system 1340 comprises a computer module 1341, input devices such as a keyboard 1342 and mouse 1343, and output devices including a printer 1357 and a display device 1356. A modulator/demodulator (modem) transceiver device 1352 is used by the computer module 1341 for communicating to and from a communications network, which is accessed via a telephone line or other functional medium. The modem 1352 can be used to attain access to the internet, and other network systems.

The computer module 1341 typically includes at least one processor unit 1345, a memory unit 1346 formed from semiconductor random access memory (RAM) and read only memory (ROM), input/output (I/O) interfaces including a video interface 1347 and an I/O interface 1348 for the keyboard 1342 and mouse 1343.

A storage device 1349 is provided and typically includes a hard disk drive 1353 and a floppy disk drive 1354. A CD-ROM drive 1355 is typically provided as a non-volatile source of data. The components 1345 to 1349 and 1353 to 1355 of the computer module 1341 communicate via an interconnecting bus 1350 in a manner which results in a conventional mode of operation of a computer system 1340 as is well known to those in the relevant art. Examples of computers on which the embodiments can be practiced include IBM-PC and compatibles, and some sparcstations.

Typically the application program of the preferred embodiment is stored on the hard disk drive 1353 and controlled using the processor 1345. Intermediate storage of the program, print list and any data fetched from the network can be accomplished using the semiconductor memory 1346, in concert with the hard disk drive 1353 as required. In some instances, the application program can be supplied to the user encoded on a CD-ROM or floppy disc, or alternatively can be read by the user from the network by the modem device 1352.

A major advantage of the present invention is that the generated textures do not rely upon modulation of existing functions, such as Perlin noise functions, reaction-diffusion, or vector fields. Furthermore, source images for use with such modulation are not required, which results in the method requiring relatively little in the way of memory or processor resources when implemented on a computer system. As well as the visually interesting results obtainable by the invention, the potential reduction in computer resources provides an additional advantage over prior art coloured or shaded texture generation schemes.

Although the invention has been described with reference to a number of specific examples, it will be appreciated by those skilled in the art that the invention may be embodied in many other forms.

The claims defining the invention are as follows:

1. A method of generating a colored or shaded texture for images, the images to be displayed on a display device or printed, said method including the steps of:
   (a) providing a plurality of shape elements, each shape element defining a surface;
   (b) assigning a focal point to each of the shape elements, wherein each shape element has an opacity that varies over its surface according to a distance from a corresponding focal point;
   (c) identifying a plurality of substantially equidistant points within a predetermined region of the images;
   (d) placing a shape element at each identified point, such that adjacent shape elements overlap with each other to fill the predetermined region of the images such that the region when so filled has a substantially uniform opacity; and
   (e) rendering the shape elements for output to a printer or display device, such that an interference of the opacities of the overlapping elements generates a colored or shaded texture.

2. A method according to claim 1, wherein the shape elements are regular geometric shapes.

3. A method according to claim 2, wherein each of the shape elements is of the same general shape.

4. A method according to claim 2, wherein the shape elements are of a similar size.

5. A method according to claim 4, wherein the shape elements are circles.

6. A method according to claim 4, wherein the shape elements include squares, hexagons, or other regular polygons.

7. A method according to claim 1, wherein each focal point is located within its associated shape element.

8. A method according to claim 7, wherein each focal point is located at or adjacent to a center of its associated shape element.

9. A method according to claim 1, wherein the opacity at any given point within each shape element is determined by the distance of that point from the focal point.

10. A method according to claim 1, wherein the opacity of each shape element varies between the focal point and the perimeter of the shape element in accordance with a predetermined function.

11. A method according to claim 10, wherein the predetermined function is exponential or linear.

12. A method according claim 1, wherein at least some of the shape elements have a color component associated with them.

13. A method according to claim 12, wherein the color components vary from shape element to shape element.

14. A method according to claim 12, wherein the color component of each shape element varies across its surface.

15. A method according to claim 12, further including the step of varying the color components of the shape elements over time, and periodically rendering the shape elements.

16. A method according to claim 15, wherein the color components are varied in a cyclic fashion.

17. A method according to claim 16, wherein a period associated with the cyclic color change is selected at random for each shape element.

18. A method according to claim 1, further including the step of, if the image is displayed on a display device, varying the opacity of one or more of the shape elements over time, and periodically rendering the shape elements.

19. A method according to claim 18, wherein the opacity is varied in a cyclic fashion.

20. A method according to claim 19, wherein a period associated with the cyclic opacity change is selected at random for each shape element.

21. A method according to claim 1, further including the step of applying the colored or shaded texture within a boundary defined by a closed curve.

22. A method according to claim 21, wherein the closed curve is defined by a font character outline.

23. An apparatus for generating a colored or shaded texture for images, the images to be displayed on a display device or printed, said apparatus including:
   (a) means for providing a plurality of shape elements, each of the shape elements defining a surface and having an opacity which varies across the surface;
   (b) assignment means for assigning a focal point to each of the shape elements, such that the opacity of each shape element varies with distance from the focal point;
   (c) means for identifying a plurality of substantially equidistant points within a predetermined region of the images;
   (d) means for placing a shape element at each identified point, such that adjacent shape elements overlap with each other to fill the predetermined region of the images such that the region when so filled has a substantially uniform opacity;
   (e) means for rendering the shape elements such that an interference of the opacities of the overlapping elements generates a colored or shaded texture; and
   (f) means for outputting the colored or shaded texture to a printer or display device.

24. An apparatus according to claim 23, wherein the shape elements are regular geometric shapes.

25. An apparatus according to claim 23, wherein the shape elements are circles.

26. An apparatus according to claim 23, wherein the assignment means assigns the focal points to areas within the respective shape elements.

27. A method of producing a printed product including a laminar substrate formed from paper, card or other reproduction medium, said method including the steps of:
   (a) providing a plurality of shape elements, each shape element defining a surface;
   (b) providing each of the shape elements with an opacity which varies across the surface;
   (c) assigning a focal point to each of the shape elements, wherein the opacity of each shape element varies with distance from the focal point:
   (d) identifying a plurality of substantially equidistant points within a predetermined region of the printed product;
   (e) placing a shape element at each identified point, such that adjacent shape elements overlap with each other to fill the predetermined region of the printed product such that the region when so filled has a substantially uniform opacity;
   (f) rendering the shape elements such that an interference of the opacities of the overlapping elements generates a colored or shaded texture; and
   (g) printing or otherwise applying the colored or shaded texture to the laminar substrate.

28. A computer storage medium storing one or more computer software programs for execution on a computer, the computer software program or programs including compiled or uncompiled software instructions for implementing a method of generating a colored or shaded texture for images to be displayed on a display device, stored or printed, including instructions for implementing the following steps:
   (a) providing a plurality of shape elements, each shape element defining a surface;
   (b) providing each of the shape elements with an opacity which varies across the surface;
   (c) assigning a focal point to each of th shape elements, wherein the opacity of each shape element varies with distance from the focal point;
   (d) identifying a plurality of substantially equidistant points within a predetermined region of the images;
   (e) placing a shape element at each identified point, such that adjacent shape elements overlap with each other to fill the predetermined region such that the region when so filled has a substantially uniform opacity; and
   (f) rendering the shape elements such that an interference of the opacities of the overlapping elements generates a colored or shaded texture.

29. A computer storage medium according to claim 28, wherein the program or programs stored thereon include instructions for implementing the additional step of displaying the colored or shaded texture on a display device associated with the computer, storing the colored or shaded texture on storage means associated with the computer or printing the colored or shaded texture on a printer associated with the computer.

30. A method of generating a colored or shaded texture for images, the images to be displayed on a display device or printed, said method including the steps of:
   (a) providing a plurality of shape elements, each shape element defining a surface;
   (b) providing each of the shape elements with an opacity which varies over its surface;
   (c) assigning a focal point to each of the shape elements, wherein the opacity of each shape element varies with distance from the focal point:
   (d) identifying a plurality of substantially equidistant points within a predetermined region of the images;
   (e) placing a shape element at each identified point, such that adjacent shape elements overlap with each other to fill the predetermined region of the images such that the region when so filled has a substantially uniform opacity;

(f) rendering the shape elements for output to a printer or display device, such that a interference of the opacities of the overlapping elements generates a colored or shaded texture; and (g) if the image is displayed on a display device, varying the opacity of one or more of the shape elements over time, and periodically the shape elements.

31. A method according to claim 30 wherein the opacity is varied in a cyclic fashion.

32. A method of generating a colored or shaded texture for images, the images to be displayed on a display device or printed, said method including the steps of:
   (a) providing a plurality of shape elements, each shape element defining a surface;
   (b) providing each of the shape elements with an opacity which varies over its surface;
   (c) assigning a focal point to each of the shape elements, wherein the opacity of each shape element varies with distance from the focal point;
   (d) identifying a plurality of substantially equidistant points within a predetermined region of the images;
   (e) placing a shape element at each identified point, such that adjacent shape elements overlap with each other to fill the predetermined region of the images such that the region when so filled has a substantially uniform opacity, the region lying within a boundary defined by a closed curve; and
   (f) rendering the shape elements for output to a printer or display device, such that an interference of the opacities of the overlapping elements generates a colored or shaded texture.

33. A method according to claim 32, wherein the closed curve is defined by a font character outline.

34. A method of generating an interference texture for an image, said method comprising the steps of:
   a) defining at least one texture region within the image;
   b) providing a plurality of shape elements, each shape element defining a surface and having an opacity that varies over the surface;
   c) assigning a focal point to each of the shape elements, wherein the opacity of each shape element varies with distance from the focal point;
   d) identifying a plurality of substantially equidistant points within each texture region;
   e) placing a shape element at each identified point such that adjacent shape elements overlap with each other to provide a substantially uniform opacity within each texture region; and
   f) rendering the shape elements for output to a printer or display device such that an interference of the opacities of the overlapping elements generates an interference texture within each texture region.

35. A method as claimed in claim 34 wherein the points are identified using a mesh-fitting algorithm.

36. A computer program product comprising program code encoded on a computer-readable medium, for controlling the operation of a data processing apparatus on which the program code executes to perform a method of generating an interference texture for an image, wherein said method comprises the steps of:
   a) defining at least one texture region within the image;
   b) providing a plurality of shape elements, each shape element defining a surface and having an opacity that varies over the surface;
   c) assigning a focal point to each of the shape elements, wherein the opacity of each shape element varies with distance from the focal point;
   d) identifying a plurality of substantially equidistant points within each texture region;
   e) placing a shape element at each identified point such that adjacent shape elements overlap with each other to provide a substantially uniform opacity within each texture region; and
   f) rendering the shape elements for output to a printer or display device such that an interference of the opacities of the overlapping elements generates an interference texture within each texture region.

* * * * *

UNITED STATES PATENT AND TRADEMARK OFFICE
CERTIFICATE OF CORRECTION

PATENT NO.      : 7,176,944 B2
APPLICATION NO. : 09/277171
DATED           : February 13, 2007
INVENTOR(S)     : Cameron Bolitho Browne It is certified that error appears in the above-identified patent and that said Letters Patent is hereby corrected as shown below:

TITLE PAGE, [56] REFERENCES CITED:

OTHER PUBLICATIONS, in "Deformable Curve …" "for," should read --for--.
    In "Illustrating Surface …" "Convolution" should read --Convolution,--.
    In "Bubble Mesh …" "Packing" should read --Packing,-- and "tIBM" should read --IBM--.
    In "Multiresolution Sampling …" "Images" should read --Images,--.
    In "Interactive Texture …" "Mapping Jerome__," should read --Mapping, Jerôme Maillot," and "Verroustz" should read --Verroust--.
    In "Piecewise Surface …" "Texture, Mapping" should read --Texture Mapping,-- and "Bennis ' Jean-Marc Vezien Gerard Iglesias, Computer" should read --Bennis, Jean-Marc Vézien, Gérard Iglésias; Computer--, and "GraDhics," should read --Graphics,--.

Under (*) Notice:

Insert the following: --This patent issued on a continued prosecution application filed under 37 CFR 1.53(d), and is subject to the twenty year patent term provisions of 35 U.S.C. 154(a)(2).--.

COLUMN 3:

Line 34, "corner, 14," should read --corner 14,--.

COLUMN 4:

Line 6, "blackwhite" should read --black-white--.

COLUMN 8:

Line 3, "point:" should read --point;--.
    Line 29, "th" should read --the--.
    Line 59, "point:" should read --point;--.

UNITED STATES PATENT AND TRADEMARK OFFICE
CERTIFICATE OF CORRECTION

PATENT NO. : 7,176,944 B2
APPLICATION NO. : 09/277171
DATED : February 13, 2007
INVENTOR(S) : Cameron Bolitho Browne It is certified that error appears in the above-identified patent and that said Letters Patent is hereby corrected as shown below:

<u>COLUMN 9</u>:

Line 8, "claim 30" should read --claim 30,--.

<u>COLUMN 10</u>:

Line 13, "claim 34" should read --claim 34,--.

Signed and Sealed this

First Day of July, 2008

JON W. DUDAS
*Director of the United States Patent and Trademark Office*